United States Patent [19]

Mizioch

[11] Patent Number: 4,921,120
[45] Date of Patent: May 1, 1990

[54] DEBRIS CAP

[76] Inventor: Gregory J. Mizioch, 12801 N. 2nd St., Phoenix, Ariz. 85022

[21] Appl. No.: 335,297

[22] Filed: Apr. 10, 1989

[51] Int. Cl.⁵ .............................................. B65D 51/18
[52] U.S. Cl. .................................... 220/254; 220/336
[58] Field of Search ..................... 220/3.8, 242, .254, 220/336, 361, 379; 215/236; 138/94; 404/25; 49/41, 198, 380, 464

[56] References Cited

U.S. PATENT DOCUMENTS

| | | | |
|---|---|---|---|
| 882,547 | 3/1908 | Chellis | 215/236 |
| 1,152,286 | 8/1915 | Brownson | 220/336 |
| 1,160,061 | 11/1915 | Friberg | 220/254 |
| 2,078,211 | 4/1937 | Williams | 220/287 |

Primary Examiner—Stephen Marcus
Assistant Examiner—Nova Stucker
Attorney, Agent, or Firm—Cahill, Sutton & Thomas

[57] ABSTRACT

A cap for an opening in a first structure access to which is through another structure having an opening therein which is smaller than the opening in the first structure. The cap is made of a segmented ring the segments of which can be separated and inserted through the opening in the second structure. The segments form a ring which is at least as large as the opening in the first structure and which has an opening therein for access to the opening in the first structure. Each ring segment has a locking member detachably engageable with a strike on an adjoining segment. The locking members hold ring segments together and substantially cover the opening in the ring when engaging their respective strikes on adjacent ring segments.

7 Claims, 1 Drawing Sheet

DEBRIS CAP

TECHNICAL FIELD

This invention is concerned with capping a first opening which is accessible only through a second opening which is smaller than the first opening. This is a common set of circumstances for pipe openings providing access to water main valves buried beneath municipal streets.

BACKGROUND ART

Municipal water companies run their mains beneath public rights of way such as streets. Normally open shut-off valves are incorporated at various locations in the mains for the purpose of isolating breaks in the mains to facilitate their repair.

These shut-off valves are usually buried several feet beneath the surface of the street and suitable access must be provided so that the valves can be manipulated. The usual practice is to cap the valve actuator with a length of access pipe which extends upwardly from the valve to a position several inches beneath the surface of the street. At street level imbedded in the pavement is a flanged cover having a removable lid.

The lid for a valve opening cover usually rests loosely on a lip in the cover. And the lids frequently are displaced either by vandals or by normal vehicular movement on the street. When this happens dirt and other debris is allowed to enter the access opening for the water valve. The access pipe leading to the valve actuator can become filled to a considerable depth with debris making it difficult to gain access to the valve actuator.

A fairly obvious solution to the problem of debris accumulation in the valve access pipe is to put a cap on the pipe just beneath the cover in the pavement. Thus, if the cover lid is displaced the cap blocks entry of debris into the valve access pipe.

With many shut-off valve installations capping the access pipe is made difficult by the fact that the opening through the cover imbedded in the pavement is smaller than the opening in the access pipe. A simple one piece cap cannot be placed on the access pipe opening because of restricted access through the cover.

Moreover, if one solves the problem of capping the access pipe through the restricted cover opening there still remains the problem of providing easy access through the cap itself to permit a tool to be extended through the access pipe to the valve actuator.

DISCLOSURE OF THE INVENTION

This invention provides solutions to the two problems alluded to above by providing an improved debris cap structure.

The cap of this invention utilizes a segmented ring, the segments of which can be disengaged for individual insertion through the limited access opening in the cover in the pavement. When the ring segments are assembled in contiguous relationship the outer dimension of the ring is sufficient to cover the opening in the access pipe.

Further, each cap ring segment carries a locking member which is mounted for movement toward and away from a strike on an adjacent segment. When the locking members are moved into engagement with their respective strikes the ring segments are locked together in a stable relationship and the locking members cover the opening in the segmented ring. Movement of the locking members away from their strikes uncovers the opening in the segmented ring permitting a tool to be inserted therethrough for engagement with the actuator of the shut-off valve.

BRIEF DESCRIPTION OF THE DRAWINGS

This invention is described in greater detail hereinafter by reference to the accompanying drawing wherein.

BEST MODE FOR CARRYING OUT THE INVENTION

Figure 1:
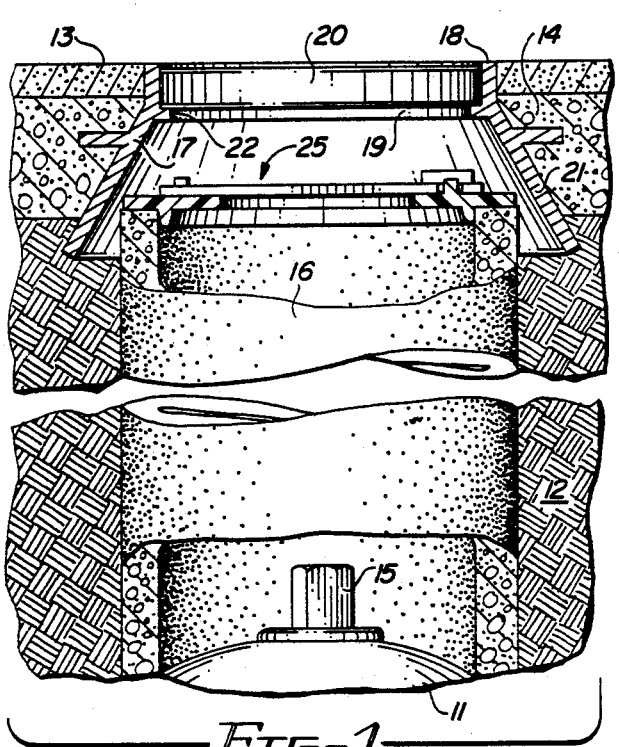
FIG. 1 is a broken and fragmentary vertical sectional view through a typical shut-off valve installation employing the improved debris cap of this invention.
Figure 2:
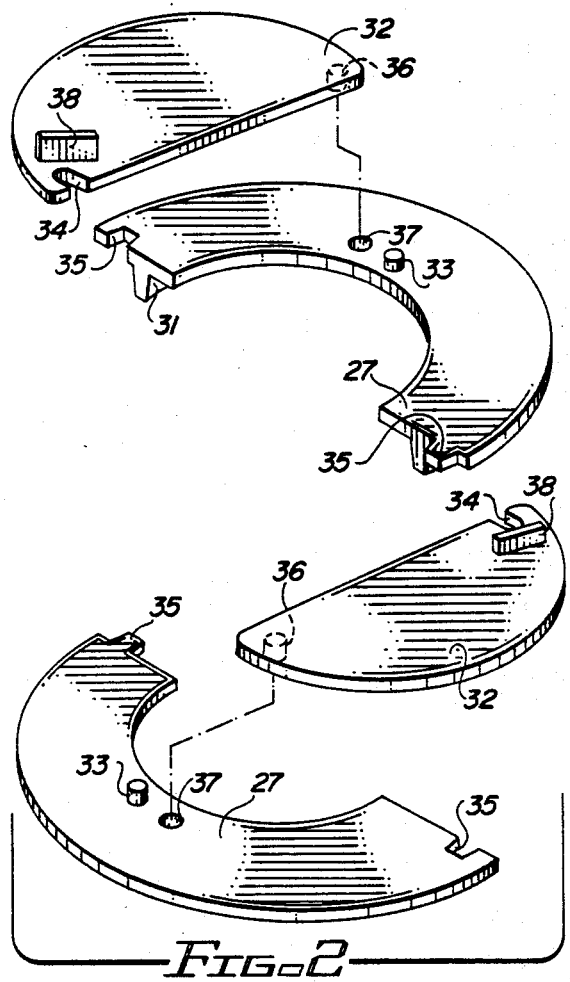
FIG. 2 is an exploded perspective view of the debris cap.

Referring particularly to FIG. 1, a water main shut-off valve is identified by reference numeral 11. The valve 11 is buried in earth 12 beneath a street 13 the pavement for which is indicated at 14.

Valve 11 may be buried several feet beneath the surface of street 13 and access must be provided to an actuator 15 on the valve through the earth 12. This is usually provided by an access pipe 16 which rests on the top of the valve 11 and extends up to within a few inches of the surface of street 13. It is thus possible for workman on the street 13 to insert a tool into the opening through access pipe 16 to engage valve actuator 15 to manipulate the valve 11 to shut it or to open it. Access pipe 16 may be formed of concrete or other strong material capable of resisting pressure from the surrounding earth 12.

In most shut-off valve installations the upper end of access pipe 16 terminates within a flanged cover 17 imbedded within the street pavement 14. Cover 17 has its upper circular surface 18 flush with the surface of the street with a circular lip 19 therebeneath for supporting a lid 20. A flared skirt 21 on cover 17 receives the upper end of access pipe 16.

It is not unusual for the lid 20 of cover 17 to be displaced by normal vehicle movement or by vandalism. With the lid 20 removed dirt and other debris can enter the opening 22 provided by lip 19 in cover 17. Over time, the access pipe 16 can become filled to the extent that a tool can no longer be placed therein to reach valve actuator 15. If it becomes necessary to close valve 11 a crew must perform the arduous and time consuming task of cleaning debris from the access pipe 16. And the time element is important in repairing a broken water main.

To prevent debris accumulation in access pipe 16 it is desirable to cap the pipe opening at its upper end. Capping the access pipe 16 is made difficult, however, by the fact that access to the opening in the pipe structure is restricted by a smaller opening 22 through the cover structure 17. A solid, one-piece cover large enough to cover the opening in access pipe 16 cannot be inserted through cover opening 22.

It is possible, of course, to use a larger cover 17 with a larger opening therethrough. This may not be desirable because the cost of the cover and the lid, which are usually made of metal such as cast iron or steel for durability.

This problem is solved by the present invention by providing an access pipe cap 25 which is made in segments, or pieces, which can be separated for insertion individually through cover opening 22. Details of construction for the best mode for carrying out the invention are illustrated in FIGS. 2 through 5.

Figure 5:
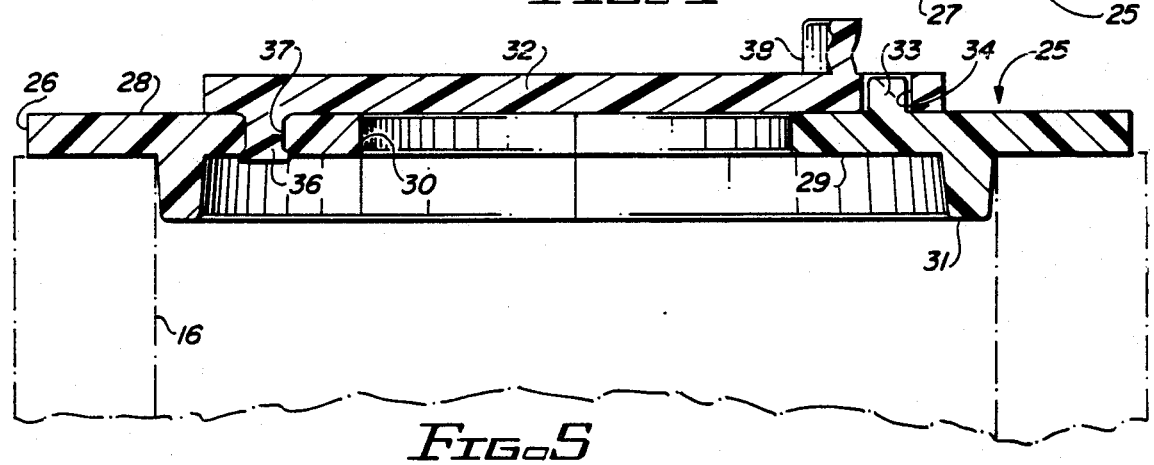
FIG. 5 is an enlarged vertical sectional view of the debris cap in place on a valve access pipe.

Cap 25 preferably comprises a segmented ring 26 having at least two separable segments 27. Ring 26 has a top surface 28 and a bottom surface 29. The outer diameter of ring 26 is sufficiently large to cover the opening in access pipe 16. The inner diameter of ring 26 provides an opening 30 which permits a tool to be inserted through the cap 25 to manipulate valve 11. Positioning of cap 25 on the upper end of access pipe 16 is facilitated by providing a circular protuberance 31 on the bottom surface 29 of ring 26. Protuberance 31, which may take the form of a ring as shown in FIG. 5, is sized to friction fit within the opening in access pipe 16 to retain the cap 20 in place on the pipe.

After ring segments 27 are inserted through cover opening 22 and assembled in contiguous relationship on the upper end of access pipe 16 the segments are locked together to keep the segmented ring 26 intact. This is accomplished by a locking member 32 which is pivotally mounted for swinging movement on the upper surface 28 of each ring segment 27 and is engagable with a strike 33 on an adjacent segment.

Each locking member 32 has a slot 34 in the free end thereof which closely confines a strike 33 on an adjacent ring segment 27 when the locking member 32 is moved into contact with the strike. With each locking member 32 engaging strike 33 of an adjacent ring segment 27 the segments are locked firmly together. If desired, the ring 26 can be further stabilized by providing tongue and groove connections 35 at contacting portions of the ring segments 27.

It is a further feature of this invention that the locking members 32 are employed to close the opening 30 in ring 26. For this purpose each locking member 32 has a semicircular configuration (see FIGS. 2 to 4) sized to completely cover opening 30 when the locking members are in their locking position and in contact with each other (FIG. 4).

Figure 3:
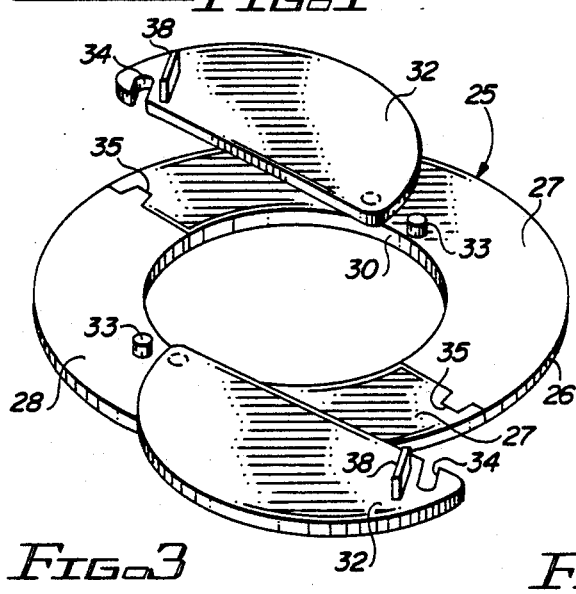
FIG. 3 is a perspective view of the assembled debris cap with its locking members open.
Figure 4:
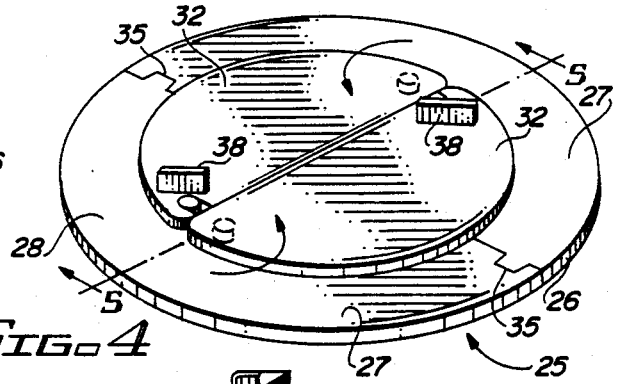
FIG. 4 is a view similar to FIG. 3, but with the locking members closed.

If access to valve 11 is desired, the locking members 32 are moved aside to a position such as illustrated in FIG. 3 to uncover opening 30 in ring 27. The pivotal mounting of each locking member 32 may conveniently comprise an integrally formed pivot pin 36 disposed in an opening 37 in the ring segment 27 to which it is attached. Each locking member 32 may also be provided with a finger grip tab 38 to facilitate moving the locking members between their locking and uncovering positions.

From the foregoing it should be apparent that this invention provides a convenient cap 25 which is insertable through a restrictive opening in one structure to close, or cap, a larger opening in another structure. It should also be appreciated that the simplicity of the cap design permits the cap to be economically manufactured. The cap 25 is comprised of two identical ring segments 27 and two identical locking members 32. Each of these components is susceptible of being formed by injection molding plastic material, a technique that produces low cost components when they are manufactured in quantity.

What is claimed is:

1. A cap for covering an opening in a first structure access to which is restricted by a second structure having an opening therein which is smaller than the opening in the first structure, said cap comprising a segmented ring, the segments of which are separable and insertable through the opening in said second structure, said ring segments when arranged in contiguous relationship providing an opening at their inner edges and having outer edges of dimensions at least as large as the opening to be covered, a locking member pivotally mounted on each of said ring segments and a strike on each of said ring segments, each locking member being moveable between first and second positions, when each locking member is in a first position a portion thereof overlies an adjacent ring segment and engages the strike carried by the adjacent segment to lock adjoining ring segments together, said locking members when in their first position substantially covering the opening in said ring, each said locking member when in its second position being separated from the strike on the adjacent ring segment to at least partially uncover the opening in said ring and to permit separation of said ring segments.

2. The cap of claim 1 further characterized in that it is comprised of two identical ring segments and two identical locking members.

3. The cap of claim 1 further characterized in that the strike on each ring segment comprises a pin and each locking member has a slot therein to receive one of said pins.

4. The cap of claim 3 further characterized in that it is comprised of two identical ring segments and two identical locking members.

5. The cap of claim 1 further characterized in that said segmented ring has a circular protuberance on one face thereof the size of the opening in the first structure.

6. A cap for covering an opening in a first structure access to which is restricted by a second structure having an opening therethrough which is smaller than the opening in the first structure, said cap comprising a segmented ring having top and bottom faces, the segments of said ring being separable and insertable through the opening in said second structure, said ring segments when arranged in contiguous relationship providing an opening at their inner edges and having outer edges of a dimension at least as large as the opening to be covered, a locking member pivotally mounted on the top face of each segment of said ring, each locking member being moveable between first and second positions, each locking member when in its first position having a portion thereof overlying an adjacent ring segment and engaging a strike carried by the adjacent segment to lock adjoining ring segments together, said locking members when in their first positions substantially covering the opening in said ring, each said locking member when in its second position being separated from the strike on the adjacent ring segment and at least partially uncovering the opening in said ring and unlocking adjacent ring segments to permit separation of said ring segments.

7. The cap of claim 6 having a circular protuberance on the bottom face of said segmented ring, said protuberance being of the size of the opening in said first structure.

* * * * *